United States Patent [19]

Kicinski et al.

[11] Patent Number: 4,487,289

[45] Date of Patent: Dec. 11, 1984

[54] EXHAUST MUFFLER WITH PROTECTIVE SHIELD

[75] Inventors: Kenneth J. Kicinski; Frederick H. Printiss, Sr.; Richard J. Jasensky, all of Stoughton, Wis.

[73] Assignee: Nelson Industries, Inc., Stoughton, Wis.

[21] Appl. No.: 353,181

[22] Filed: Mar. 1, 1982

[51] Int. Cl.³ .......................... F01N 1/10; F01N 1/14
[52] U.S. Cl. ................................... 181/252; 181/255; 181/263; 181/283
[58] Field of Search ............... 181/211, 238, 239, 249, 181/250-255, 256, 262, 263, 257, 282, 283; 165/154, 157

[56] References Cited

U.S. PATENT DOCUMENTS

| | | | |
|---|---|---|---|
| 1,938,973 | 12/1933 | Oldberg | 181/250 |
| 2,229,576 | 1/1941 | Kirby | 181/262 |
| 2,831,548 | 4/1958 | Barkelew | 181/262 |
| 3,073,684 | 1/1963 | Williams, Sr. | 181/257 X |
| 4,147,230 | 4/1979 | Ormond et al. | 181/262 X |
| 4,265,332 | 5/1981 | Presnall et al. | 181/211 |

OTHER PUBLICATIONS

Nelson Drawing 17221-A, 10-1-79.
Nelson Drawing 17653-B, 11-21-79.
Nelson Drawing T-11880, 11-12-80.
Nelson Drawing T-11559, 3-6-70.
Nelson Drawing 11620-N, 4-13-70.
Nelson Drawing T-11436, 11-26-69.
Nelson Drawing T-10828, 8-5-69.

*Primary Examiner*—Benjamin R. Fuller
*Attorney, Agent, or Firm*—Andrus, Sceales, Starke & Sawall

[57] ABSTRACT

An exhaust muffler having a protective shield to reduce noise radiation and to decrease the temperature of the exhaust gases being discharged from the muffler. The muffler is composed of an outer body enclosed at its ends by flanges, and an outer insulated shell is spaced outwardly from the body and is connected to the peripheral edges of the flanges. Holes are provided in the flanges which communicate with the space between the shell and the body so that air is drawn by convection through the space between the outer body and the shell. A tubular member is spaced outwardly of the outlet pipe of the muffler and the outer end of the tubular member projects outwardly beyond the outer end of the outlet pipe. Openings are provided in the base of the tubular member and exhaust gas being discharged from the outlet pipe creates an aspirating action, so that air is drawn in through the openings into the space between the tubular member and the outlet pipe by both convection and aspirating action to aid in cooling the exhaust gases being discharged through the outlet pipe.

11 Claims, 9 Drawing Figures

EXHAUST MUFFLER WITH PROTECTIVE SHIELD

BACKGROUND OF THE INVENTION

Exhaust mufflers, as used in association with material handling trucks, usually extend vertically from the engine and are often located in a position where they can accidentally be contacted by the operator. To prevent injury to the operator from the heated muffler, it is desirable to provide a heat insulating cover for the muffler.

As the muffler on a material handling truck may frequently come in close proximity to flammable materials, such as paper cartons, bales of combustible materials, and the like, it is desirable to reduce the temperature of the exhaust gases being discharged from the muffler in order to minimize any potential fire hazard.

Attempts have been made in the past to utilize an outer heat shield in association with a muffler, as disclosed in U.S. Pat. No. 4,265,332. In the heat shield, as disclosed in the aforementioned patent, a metal shield is spaced outwardly of the muffler body and is tapered, in the area of the muffler outlet pipe to a smaller cross sectional area, thus providing a venturi so that air will be drawn through the space between the shield and the muffler, both by convection and aspiration, to reduce the temperature of the gas being discharged from the muffler.

SUMMARY OF THE INVENTION

The invention is directed to an improved exhaust muffler having an insulated protective shield which acts to reduce noise radiation from the muffler body, as well as to cool the exhaust gases. In accordance with the invention, the muffler includes a tubular body or casing which is enclosed at opposite ends by flanges or heads, and an inlet pipe, connected to the exhaust manifold of the engine, is connected to the lower head, while the outlet pipe is connected to the opposite or upper head.

Located radially outward of the body is an insulated shell which is mounted to the peripheral edges of the end flanges. Holes are provided in both of the end flanges and the holes communicate with the annular passage between the shield and the muffler body. With this construction, air will be drawn by convection into the passage to cool the muffler.

As a further feature of the invention a separate tubular member is positioned radially outward of the outlet pipe of the muffler, and the outer end of the tubular member extends outwardly beyond the corresponding end of the outlet pipe. Openings are provided in the lower end of the tubular member adjacent the muffler body and establish communication between the annular passage and the space between the tubular member and the outlet pipe. Exhaust gas exiting from the upper end of the outlet pipe into the tubular member provides a venturi effect so that air will be drawn into the annular passage by both convection and an aspirating action, to further cool the exhaust gases.

The insulated shell, which surrounds the muffler body, is a sandwich construction in which a layer of ceramic fibers are sandwiched between inner and outer metal layers. With this construction, the shell serves as a heat insulating structure to prevent injury to the operator in the event the operator would accidentally contact the shell. The shell also provides a secondary function in reducing the noise radiation from the body of the muffler.

The outlet pipe of the muffler is curved and the tubular member, which surrounds the outlet pipe, is similarly contoured. The curved contour serves to direct the exhaust gas as well as noise away from the operator and provide a more comfortable environment.

In a modified form of the invention, the insulated shell, which surrounds the muffler body, defines an annular chamber that is closed to the atmosphere. A condiut connects the lower end of the chamber with an air cleaner for the engine, while the upper end of the chamber is in communication with the throat of a venturi which is positioned in the exhaust gas outlet pipe. With this system, exhaust gas exiting from the outlet pipe provides an aspirating effect to draw air through the air cleaner to thereby scavenge dirt from the air cleaner.

Other objects and advantages will appear in the course of the following description.

DESCRIPTION OF THE DRAWINGS

The drawings illustrate the best mode presently contemplated of carrying out the invention.

In the drawings.

DESCRIPTION OF THE ILLUSTRATED EMBODIMENT

Figure 1:
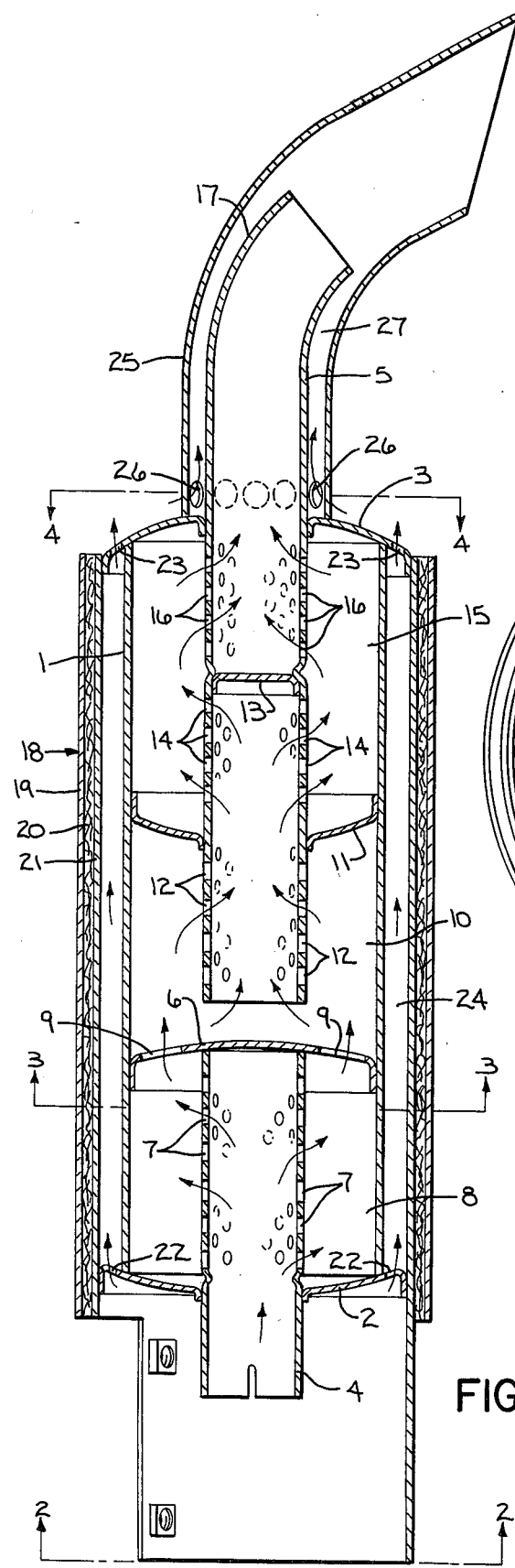
FIG. 1 is a longitudinal section of the muffler of the invention.
Figure 2:
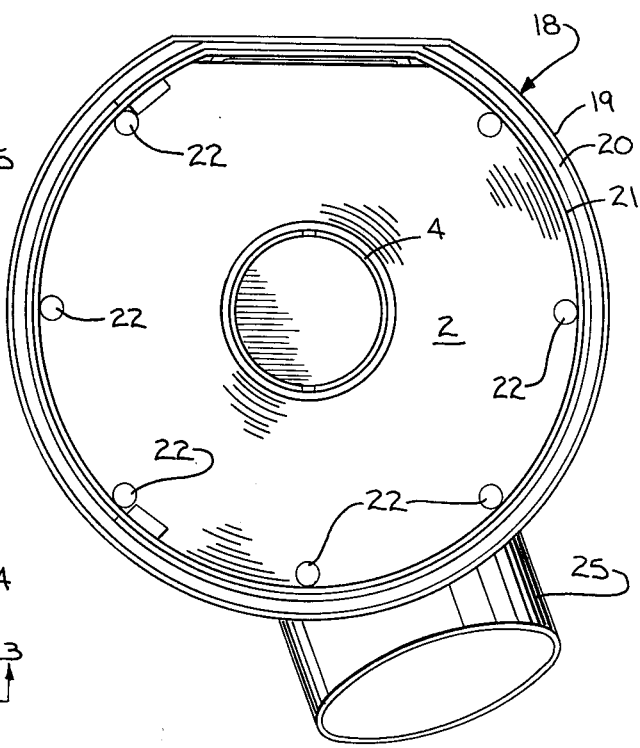
FIG. 2 is a section taken along line 2—2 of FIG. 1.
Figure 3:
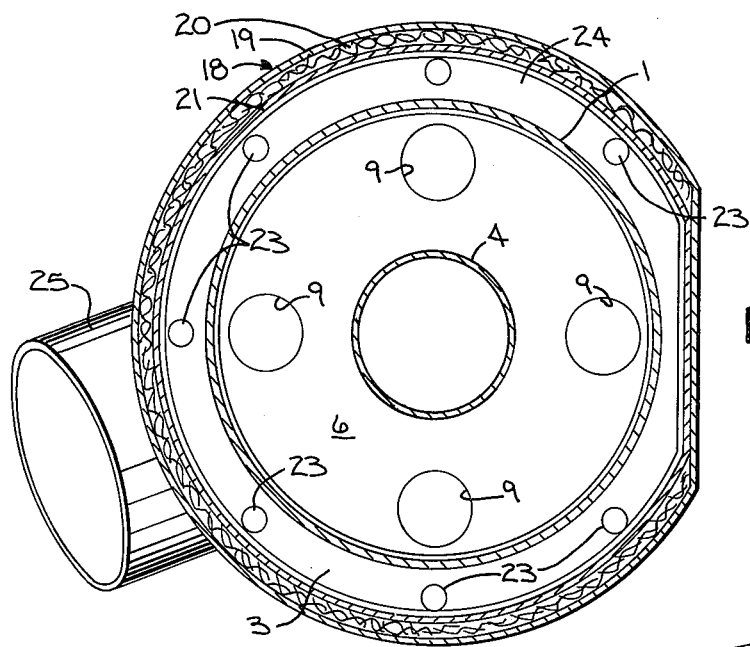
FIG. 3 is a section taken along line 3—3 of FIG. 1.

FIG. 1 illustrates a muffler which has particular application for use with a material handling vehicle, such as a fork lift truck. In this application, the muffler extends vertically.

The muffler comprises an outer generally cylindrical body 1 which is enclosed at its ends by end heads or flanges 2 and 3. An inlet pipe 4, which is connected to the exhaust manifold of the engine, is mounted within an opening in the lower end head 2, while an outlet pipe 5 is mounted within a central opening in the upper head 3.

The interior construction of the muffler itself is conventional and forms no part of the present invention. As shown in FIG. 1, the inner end of the inlet pipe 4 is closed off by a baffle or flange 6 which is secured to the inner wall of the body. The inner portion of the inlet pipe 4 is provided with a plurality of perforations 7, so that the exhaust gas will pass from the inlet pipe 4 through the perforations 7 and into annular chamber 8.

The outer periphery of baffle 6 has a plurality of openings 8 which provide communication between the end chamber 8 and central chamber 20, so that the exhaust gases pass from the chamber 8 to the chamber 10.

The lower portion of the outlet pipe 5 is supported by a closed flange or baffle 11 which is connected to the inner wall of the body so that the gases are directed from chamber 10 into the open lower end of outlet pipe 5, as well as being directed through perforations 12 into pipe 5. A closed plug 13 is mounted within the central portion of the outlet pipe 5 and serves to direct the gases outwardly through perforations 14 into upper chamber 15. From chamber 15 the gases flow inwardly through the perforations 16 on the opposite side of the plug 13 into the outlet pipe 5 and are subsequently discharged to the atmosphere through upper curved end 17 of the outlet pipe.

In accordance with the invention, an outer cylindrical insulating shell 18 is spaced outwardly from the body 1, and the sheet is composed of an outer metal layer 19, a central layer of insulating material 20, such as ceramic fibers, and an inner metal layer 21. To mount the shell 18 to the muffler body 1, the end heads 2 and 3 extend radially beyond the body, and the ends of inner wall 21 of the shell are welded to the peripheral flanges of the respective heads. This method of connecting the shell 18 to the muffler body 1 requires no additional parts, nor auxiliary fasteners, as well as providing an esthetically pleasing appearance.

Holes 22 and 23 are formed in the heads 2 and 3, respectively, and air is drawn through the holes 22 into the annular passage 24 by convection and is discharged through the upper holes 23. The air flowing within the passage 24 serves to cool the muffler body and thereby aids in reducing the temperature of the exhaust gases being discharged from the muffler.

A tubular member or shield 25 is mounted to the upper head 3 and surrounds the outlet pipe 5. As shown in FIG. 1, the tubular member 25 conforms to the curvature of the end 17 of the outlet pipe and projects a substantial distance beyond the upper extremity of the outlet pipe. Holes 26 are formed in the lower portion of the shield 25 and communicate with the space 27 between the member 25 and the outlet pipe.

As the exhaust gases exit the outlet pipe, there will be a tendency for an aspirating action as well as a convection effect to draw air through the holes 26 and into space 27. The air passing through the space 27 will further aid to cool the exhaust gases being discharged from the muffler.

Figure 4:
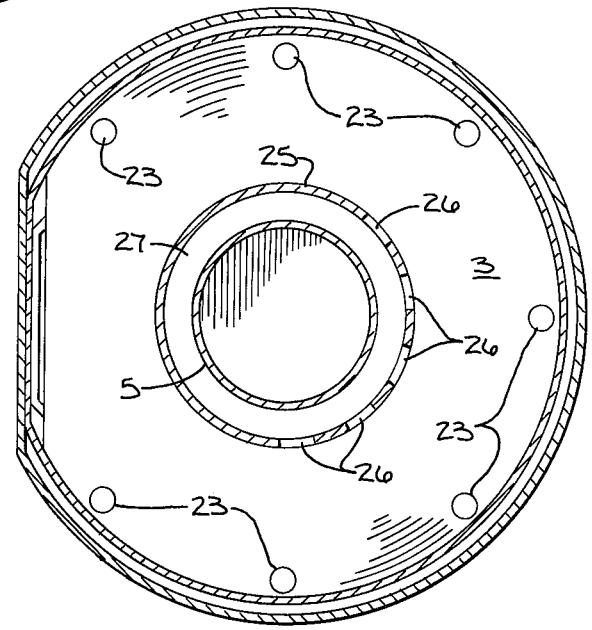
FIG. 4 is a fragmentary longitudinal section of a modified form of the invention.
Figure 5:
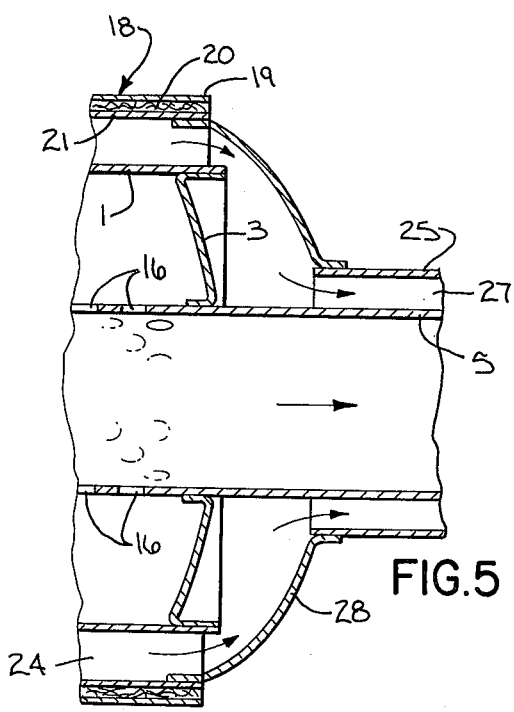
FIG. 5 is a fragmentary longitudinal section of a modified form of the invention.
Figure 9:
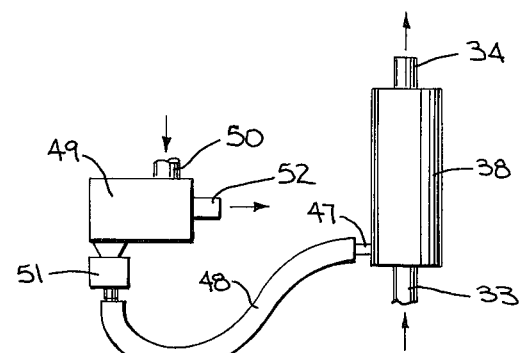
FIG. 9 is a diagrammatic view showing the muffler of FIG. 6 as connected to the air pre-cleaner for the engine.

FIG. 4 illustrates a modified form of the invention in which a baffle or flange 28 connects the upper end of shell 18 and shield 25. More specifically, the outer periphery of the baffle 28 is welded to the inner metal layer 21 of shell 18, while the inner peripheral edge of baffle 28 is secured to the tubular member 25. With this construction, the air flowing upwardly within the annular passage 24 will be guided by the baffle 28 into space 27. Through use of baffle 28 air will be drawn through the passage 24 and space 27 by aspirating action, as well as convection to thereby provide improved efficiency for the heat transfer operation.

Figure 6:
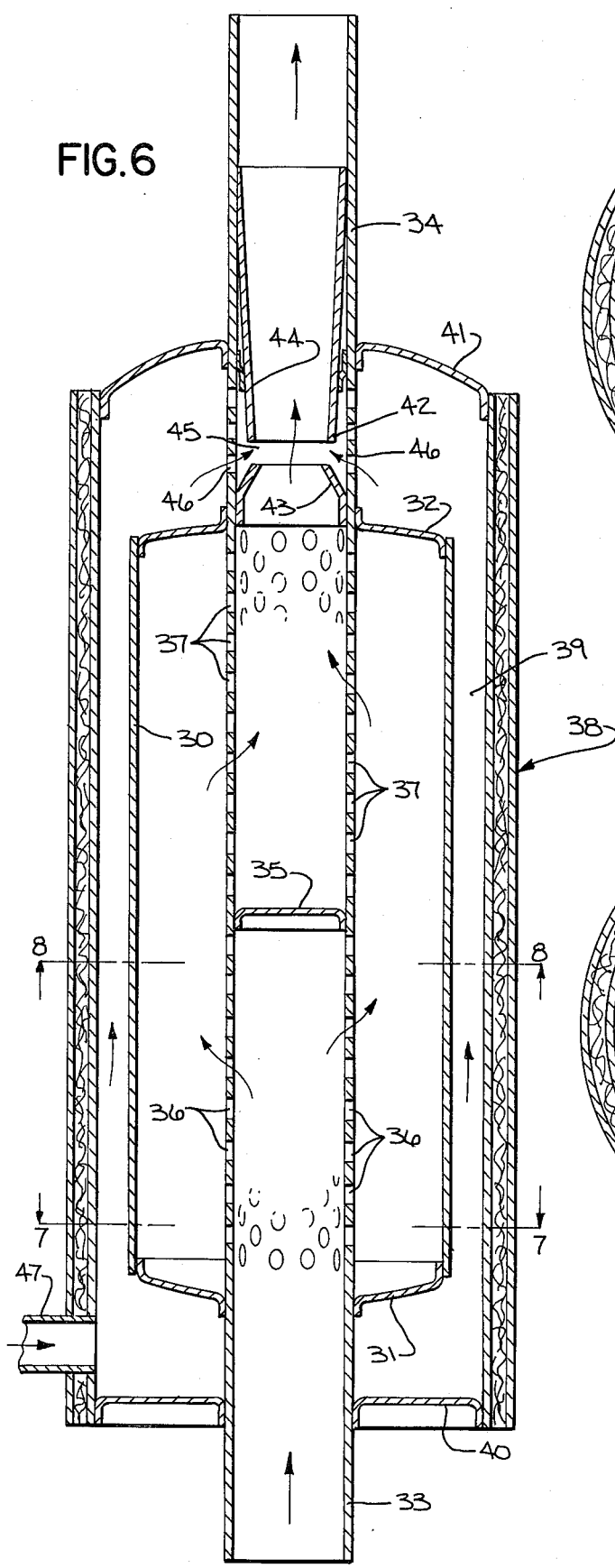
FIG. 6 is a longitudinal section of a modified form of the invention in which the muffler is incorporated with the air cleaner for the engine.
Figure 7:
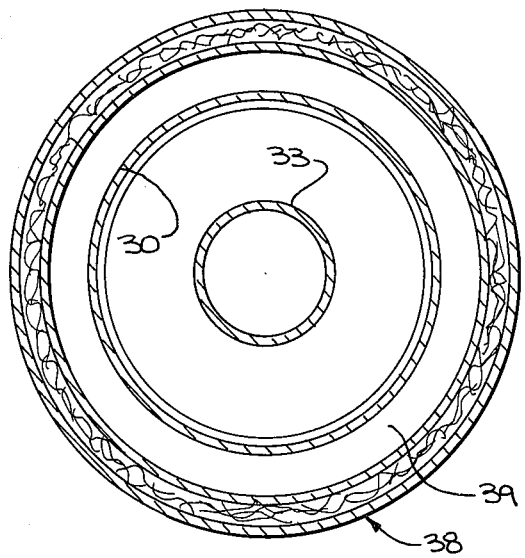
FIG. 7 is a section taken along line 7—7 of FIG. 6.
Figure 8:
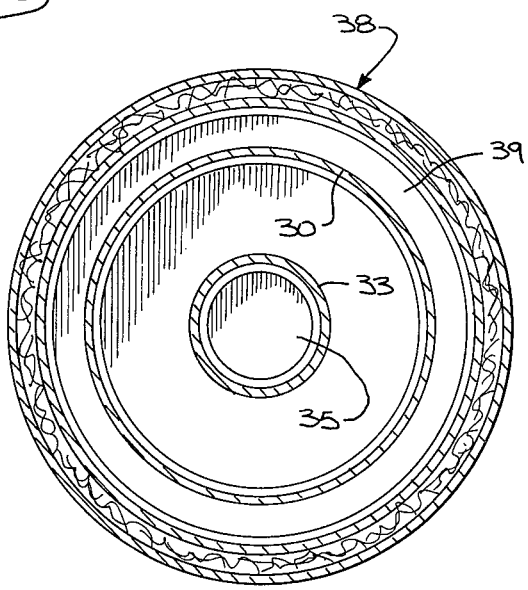
FIG. 8 is a section taken along line 8—8 of FIG. 6.

FIGS. 6–9 illustrate a second modified form of the invention in which the muffler is associated with the air pre-cleaner for the engine. The muffler includes a generally cylindrical body 30 which is enclosed at its lower end by a head or flange 31 and at its upper end by a head 32. Exhaust gas from the engine is introduced into the body via an inlet pipe 33 that is mounted in head 31, and is discharged from the body through out-let pipe 34 in upper head 32. A closed plug 35 is located centrally of the body and closes off the inlet pipe 33 from the outlet pipe 34. As shown in FIG. 6, the portion of the inlet pipe 33 located within the muffler body 30 is provided with a plurality of perforations 36, and similarly the portion of outlet pipe 34 disposed within the body is formed with a multiplicity of perforations 37. With this construction, the exhaust gas entering the inlet pipe 33 will pass outwardly through the perforations 36 into the space between pipe 33 and body 30 and then through the perforation 37 to the outlet pipe 34.

In accordance with the invention, a heat insulating shell 38, similar in construction to shell 18, is spaced radially outward of body 36 to define an annular chamber 38 therebetween. The lower end of the shell 38 is enclosed by a flange 40 which is connected between the shell 38 and the inlet pipe 33, while the upper end of the shell is enclosed by a head 41 which is connected between the upper end of the shell and the outlet pipe 34.

A venturi 42 is located in the upper end portion of outlet pipe 34 and comprises an inwardly converging nozzle section 43 and a diverging outlet section 44 which is spaced longitudinally from the inlet section 43 to provide a throat or space 45 therebetween. Holes 46 in outlet pipe 34 provide communication between the chamber 39 and the throat 45 of the venturi. The venturi 42 will produce an increase in velocity of the exhaust gas and a corresponding reduction in pressure at the region of throat 45 to thereby draw air through the chamber 39 and holes 46 to the venturi.

As illustrated in FIG. 6, a conduit 47 extends through an opening in the lower portion of shell 38 and communicates with the chamber 39. The opposite end of conduit 47 is connected via a hose 48 to air pre-cleaner 49 for the engine. The air pre-cleaner 49 can be constructed as described in pending U.S. application Ser. No. 287,888, filed July 29, 1981, now U.S. Pat. No. 4,388,091.

In general, air is drawn into the pre-cleaner 49 through inlet 50 and the air is directed through a path of flow in pre-cleaner 49 which tends to separate dirt and particulate material, which collects in receptacle 51, while the air is discharged through outlet 52 to the carburetor of the engine. The outlet of receptacle 51, which is connected to hose 48, contains a check valve which permits flow from the receptacle, but prevents flow into the receptacle. With this system, the aspirating action of venturi 42 will draw air and dirt from the receptacle 51 through hose 48 to the muffler, thereby continuously scavenging dirt from the pre-cleaner during periods of operation of the engine. The air being scavenged from pre-cleaner 49 acts to cool the muffler as it flows through chamber 39.

The outer shell, being formed of heat insulating material, serves as a protective cover to prevent injury to the operator in the event the operator might accidentally contact the muffler. The shell also provides a secondary function in defining an air passage which aids in removing heat from the muffler and thereby decreasing the temperature of the exhaust gases.

Various modes of carrying out the invention are contemplated as being within the scope of the following claims particularly pointing out and distinctly claiming the subject matter which is regarded as the invention.

We claim:

1. A muffler construction comprising, a muffler including an elongated vertically disposed outer tubular body, a first head enclosing one end of the body, a second head enclosing the opposite end of the body, an inlet pipe for introducing exhaust gas into the muffler, an outlet pipe for discharging the exhaust gas from the muffler, a heat insulated shell spaced radially outward of said body to provide an annular passage therebetween, said heads projecting radially beyond said body and being connected to the respective ends of said shell, a plurality of first holes disposed in the first end head and communicating with one end of said passage, and a plurality of second holes disposed in the second head and communicating with the opposite end of said passage, air being passed by convection through said first holes and said passage and being discharged through said second holes to thereby cool said body.

2. The muffler construction of claim 1, wherein said shell comprises an outer layer of metal, an inner layer of metal spaced inwardly of said outer layer, and an intermediate layer of heat insulating material.

3. The muffler construction of claim 1, wherein said heat insulating material comprises ceramic fibers.

4. The muffler construction of claim 1, wherein said heads are provided with longitudinally extending peripheral flanges, said flanges being secured to the shell.

5. A muffler construction comprising, a muffler including an outer tubular body and a first head enclosing one end of the body and a second head enclosing the opposite end of the body, an inlet pipe for introducing exhaust gas into the muffler, an outlet pipe to discharge exhaust gas from the muffler and having an outer portion projecting beyond said second head, and a tubular member disposed radially outward of the outer portion of said outlet pipe and having an inner end secured to said second head, said tubular member having a larger cross sectional area than the cross sectional area of the outer end of said outlet pipe, an aperture in said tubular member adjacent said second head and providing communication between the interior of said tubular member and the atmosphere, the exhaust gas being discharged from said outlet pipe into said tubular member creating an aspirating action to draw air through said aperture into said tubular member to thereby aid in reducing the temperature of the exhaust gas being discharged through said outlet pipe.

6. The muffler construction of claim 5, wherein said outlet pipe extends through one of said heads and said tubular member has a plurality of apertures disposed adjacent said one head.

7. The muffler construction of claim 5, and including a heat insulated shell spaced radially outward of said body to provide an annular passage therebetween, air flowing upwardly within said passage to cool said body.

8. A muffler construction comprising, a muffler including an outer tubular body and a lower head enclosing the lower end of said body and an upper head enclosing the upper end of said body, an inlet pipe disposed in the lower portion of the muffler for introducing exhaust gas into the muffler, an outlet pipe mounted within the upper head and having an outer portion projecting outwardly beyond said upper head, a heat insulated shell spaced radially outward of said body to provide an annular passage therebetween, air adapted to flow upwardly within said passage to cool said body, a tubular member disposed radially outward of the outer portion of said outlet pipe, an aperture in said tubular member adjacent said upper head, the outer end of the tubular member projecting a substantial distance beyond the outer end of said outlet pipe, the exhaust gas being discharged from said outlet pipe into said tubular member creating an aspirating action to draw air into the space between said tubular member and said outlet pipe through said aperture to thereby cool said exhaust gas in said outlet pipe.

9. The muffler construction of claim 8, wherein the outer portion of said outlet pipe is curved, said tubular member is curved to conform to the curvature of said outlet pipe, said curvature aiding in providing an aspirating action to draw air into said space.

10. A muffler construction, comprising an outlet tubular body, a lower head enclosing the lower end of the body, and an upper head enclosing the upper end of the body, an inlet pipe disposed in the lower portion of the body for introducing exhaust gases into the body, an outlet pipe mounted in the upper end portion of the body for discharging exhaust gas from the body, a venturi located in the outlet pipe, a shell spaced radially outward of said body to provide an annular chamber therebetween, said venturi having an inlet portion and an outlet portion and a throat portion located between said inlet and said outlet portions, passage means providing communication between said chamber and the throat portion of said venturi, an air pre-cleaner for an internal combustion entine, said air pre-cleaner having an inlet to receive air and having an outlet to discharge filtered air and having a dust collecting receptacle, and conduit means connecting the receptacle of said pre-cleaner with the lower portion of said chamber, whereby the aspirating action created by said venturi will draw dust from said pre-cleaner through said conduit means to said chamber and then through said passage means to said outlet pipe.

11. A muffler construction, comprising a muffler including an outer tubular body, a first head enclosing one end of the body, a second head enclosing the opposite end of the body, an inlet pipe for introducing exhaust gas into the body, an outlet pipe extending through the second head for discharging exhaust gas from the body, the portion of the outlet pipe located outwardly of said second head being curved, an outer tubular member spaced outwardly of the outlet pipe to provide a passage therebetween, said tubular member being curved to complement the curvature of said outlet pipe and the outer end of the tubular member projecting a substantial distance beyond the outer end of the outlet pipe, and an outer shell spaced outwardly of said body to provide a space therebetween, the inner end of said tubular member communicating with one end of the space between the body and said shell, the opposite end of said space being open to the atmosphere, air being passed by convection through said space to said passage and the discharge of exhaust gas from the end of said curved outlet pipe into said tubular member creating an aspirating action to increase the flow of air through said space to said passage.

* * * * *

UNITED STATES PATENT AND TRADEMARK OFFICE
CERTIFICATE OF CORRECTION

PATENT NO. : 4,487,289

DATED : December 11, 1984

INVENTOR(S) : KENNETH J. KICINSKI ET AL

It is certified that error appears in the above-identified patent and that said Letters Patent is hereby corrected as shown below:

Col. 2, Line 11, Delete "condiut" and substitute therefor ---conduit---; Col. 4, Line 15, Delete "38" and substitute therefor ---39---; Col. 6 Line 15, CLAIM 10, Cancel "entine" and substitute therefor ---engine---.

Signed and Sealed this

Thirtieth Day of April 1985

[SEAL]

Attest:

DONALD J. QUIGG

Attesting Officer  Acting Commissioner of Patents and Trademarks